(12) United States Patent
Tran Vu et al.

(10) Patent No.: US 12,354,251 B2
(45) Date of Patent: Jul. 8, 2025

(54) DETECTION OF STRUCTURES

(71) Applicant: Baker Hughes Holdings LLC, Houston, TX (US)

(72) Inventors: Dang Hai Tran Vu, Bad Oeynhausen (DE); Alexander Suppes, Hürth (DE)

(73) Assignee: Baker Hughes Holdings LLC, Houston, TX (US)

( * ) Notice: Subject to any disclaimer, the term of this patent is extended or adjusted under 35 U.S.C. 154(b) by 631 days.

(21) Appl. No.: 17/580,892

(22) Filed: Jan. 21, 2022

(65) Prior Publication Data
US 2023/0237634 A1     Jul. 27, 2023

(51) Int. Cl.
*G06T 7/00* (2017.01)
*G06T 7/70* (2017.01)

(52) U.S. Cl.
CPC .............. *G06T 7/0004* (2013.01); *G06T 7/70* (2017.01); *G06T 2207/10072* (2013.01); *G06T 2207/10116* (2013.01); *G06T 2207/20081* (2013.01)

(58) Field of Classification Search
CPC . G06T 2207/10072; G06T 2207/10081; G06T 2207/10116; G06T 7/33; G06T 2207/30108; G06T 7/0004; G06T 7/0002; G06T 2207/20081; G06T 7/70; G01N 23/046; G01N 25/72; G06V 10/25; G06V 10/22; G06V 40/168; G06V 2201/07; G06V 20/695; G06V 10/774; G06V 40/172; G06V 20/70; G06V 10/764; G06V 20/698; G06N 3/08; G06N 20/00; G06F 18/214; G06F 18/2431; G06F 18/24765; G06F 18/24;
(Continued)

(56) References Cited

U.S. PATENT DOCUMENTS

| | | | | |
|---|---|---|---|---|
| 7,902,518 | B2 * | 3/2011 | Ballard | H01M 10/4285 |
| | | | | 250/390.06 |
| 9,313,265 | B2 * | 4/2016 | Peterson | G06F 16/29 |
| 9,600,778 | B2 * | 3/2017 | Sapiro | A61B 6/501 |

(Continued)

FOREIGN PATENT DOCUMENTS

CN    112258459 A  *  1/2021   ......... G01N 21/8851

OTHER PUBLICATIONS

"X-Ray Inspection of Batteries for Optimized Internal Design", North Star Imaging Inc., Jan. 30, 2017, 1-6 pgs.

*Primary Examiner* — Manav Seth
(74) *Attorney, Agent, or Firm* — Mintz, Levin, Cohn, Ferris, Glovsky and Popeo, P.C.

(57) ABSTRACT

A method for detecting structures is provided. The method can include receiving inspection image data characterizing a region of interest of an object being inspected. The regions of interest can include one or more structures of the object. The method can also include determining, using a computer vision algorithm, a structure within the region of interest with respect to photometric properties of pixel data in the inspection image data. The structure can be determined using a predictive model trained to determine image filter parameter values for image filters of the computer vision algorithm based on applying optimization techniques using training image data and annotation data. An indication of the structure can be provided, for example for display or storage in memory. Systems and computer-readable mediums implementing the method are also provided.

20 Claims, 15 Drawing Sheets

(58) Field of Classification Search
CPC .. G06F 16/55; G06F 18/2148; G06F 18/2433; G06F 18/22
See application file for complete search history.

(56) References Cited

U.S. PATENT DOCUMENTS

| | | | | |
|---|---|---|---|---|
| 9,823,744 | B2* | 11/2017 | Publicover | G06F 21/32 |
| 10,489,691 | B2* | 11/2019 | Schrier | G06T 5/70 |
| 11,188,800 | B1* | 11/2021 | Douglas | G06V 10/22 |
| 11,599,986 | B2* | 3/2023 | Afrasiabi | G06F 18/214 |
| 2016/0274660 | A1* | 9/2016 | Publicover | H04W 12/33 |
| 2019/0221897 | A1 | 7/2019 | Basu et al. | |
| 2020/0082199 | A1 | 3/2020 | Wen et al. | |
| 2021/0390674 | A1* | 12/2021 | Afrasiabi | G06F 18/214 |
| 2022/0020203 | A1* | 1/2022 | Paglieroni | G06T 15/005 |

\* cited by examiner

DETECTION OF STRUCTURES

BACKGROUND

Object inspection can be performed using image data to assess the object for structures present within the object, as well as quality or defects of the object. Rapidly and accurately characterizing the structures, quality, and defects of an object can reduce operating costs and improve object quality and/or reliability in manufacturing and industrial operations. Computer-implemented inspection systems configured to process inspection image data can reduce inspection times and further improve inspection quality.

Machine learning is an application of artificial intelligence that automates the development of an analytical model by using algorithms that iteratively learn patterns from data without explicit indication of the data patterns. Machine learning can enable the construction of training models or algorithms that can accurately learn from data and can be used to generate prediction models or algorithms that can be deployed for use in data-driven predictions or decisions.

SUMMARY

In an aspect, a method for detecting structures in inspection image data is provided. In one embodiment, the method can include receiving, by at data processor, first image data acquired during an inspection of an object The first image data can characterize a region of interest of the object. The region of interest can contain one or more structures of the object. The method can also include determining, using the data processor and a computer vision algorithm, at least one structure of the one or more structures within the region of interest. The computer vision algorithm can include a plurality of image filters configured to filter the first image data with respect to photometric properties of a plurality of pixels of the first image data. Each image filter of the plurality of image filters can include one or more image filter parameters. The method can further include providing an indication of the at least one structure in second image data.

In another embodiment, determining the at least one structure within the region of interest can further include receiving, using the data processor, training image data of the object. The training image data can include at least one first annotation identifying at least one structure of an object present in at least one region of interest in the training image data. Determining the at least one structure within the region of interest can also include determining, using the data processor and a predictive model, at least one set of image filter parameter values associated with at least one image filter parameter of the plurality of image filters. The predictive model can be trained to receive the training image data including at least one first annotation and can determine the at least one set of image filter parameter values for each image filter parameter of the plurality of image filters based on applying at least one optimization technique using the training image data and the at least one first annotation. Determining the at least one structure within the region of interest can also include updating at least one image filter of the computer vision algorithm based on the at least one set of image filter parameter values.

In another embodiment, the at least one optimization technique can include a grid search technique, a random search technique, a Levenberg-Marquardt technique, a gradient search technique, a Bayesian optimization technique, or a combination of two or more optimization techniques. In another embodiment, the predictive model can be trained to determine the at least one set of image filter parameter values for at least one of, a mean profile image filter parameter, a line tracking image filter parameter, or a stop criteria image filter parameter.

In another embodiment, responsive to providing the indication of the at least one structure in the second image data, the method can further include modifying the indication in the second image data with at least one annotation and including the second image data in the training image data. The second image data can include the annotation of the at least one structure. Responsive to providing the indication of the at least one structure in the second image data, the method can also include characterizing the region of interest of the object. The characterizing can include characterizing a defect in the region of interest or characterizing the region of interest as defective. Responsive to providing the indication of the at least one structure in the second image data, the method can further include determining the at least one set of image filter parameter values based on the training the predictive model using the training image data including the second image data and the annotation of the at least one structure.

In another embodiment, the computer vision algorithm can be configured to generate profile data associated with a portion of the plurality of pixels. The portion can correspond to at least one structure present within the region of interest, and the profile data can include at least one of photometric data, tip detection data, particle detection data, or void detection data. In another embodiment, the first image data can include two-dimensional computed tomography image data, three-dimensional computed tomography image data, or x-ray radiograph data.

In another embodiment, the object can be a lithium-ion battery, a nickel-metal hydride battery, or a nickel-cadmium battery. In another embodiment, the region of interest can include at least one of a cathode of a battery, an anode of a battery, a housing of a battery, a volume between a cathode of a battery and an anode of a battery, a centerline of a cathode of a battery, a centerline of an anode of a battery, and a profile of a shape of a battery.

In another embodiment, the method can include determining, using the data processor, at least one of a position of the object within the region of interest, or an alignment of one or more portions of the first image data. The one or more portions can include the region of interest characterizing the object. The method can also include providing the position of the object within the region of interest or an indication of the alignment of one or more portions of the first image data.

Non-transitory computer program products (i.e., physically embodied computer program products) are also described that store instructions, which when executed by one or more data processors of one or more computing systems, causes at least one data processor to perform operations herein. Similarly, computer systems are also described that may include one or more data processors and memory coupled to the one or more data processors. The memory may temporarily or permanently store instructions that cause at least one processor to perform one or more of the operations described herein. In addition, methods can be implemented by one or more data processors either within a single computing system or distributed among two or more computing systems. Such computing systems can be connected and can exchange data and/or commands or other instructions or the like via one or more connections, including a connection over a network (e.g. the Internet, a wireless wide area network, a local area network, a wide area network, a wired network, or the like), via a direct connection between one or more of the multiple computing systems, etc.

DESCRIPTION OF DRAWINGS

These and other features will be more readily understood from the following detailed description taken in conjunction with the accompanying drawings, in which.

Figure 1:
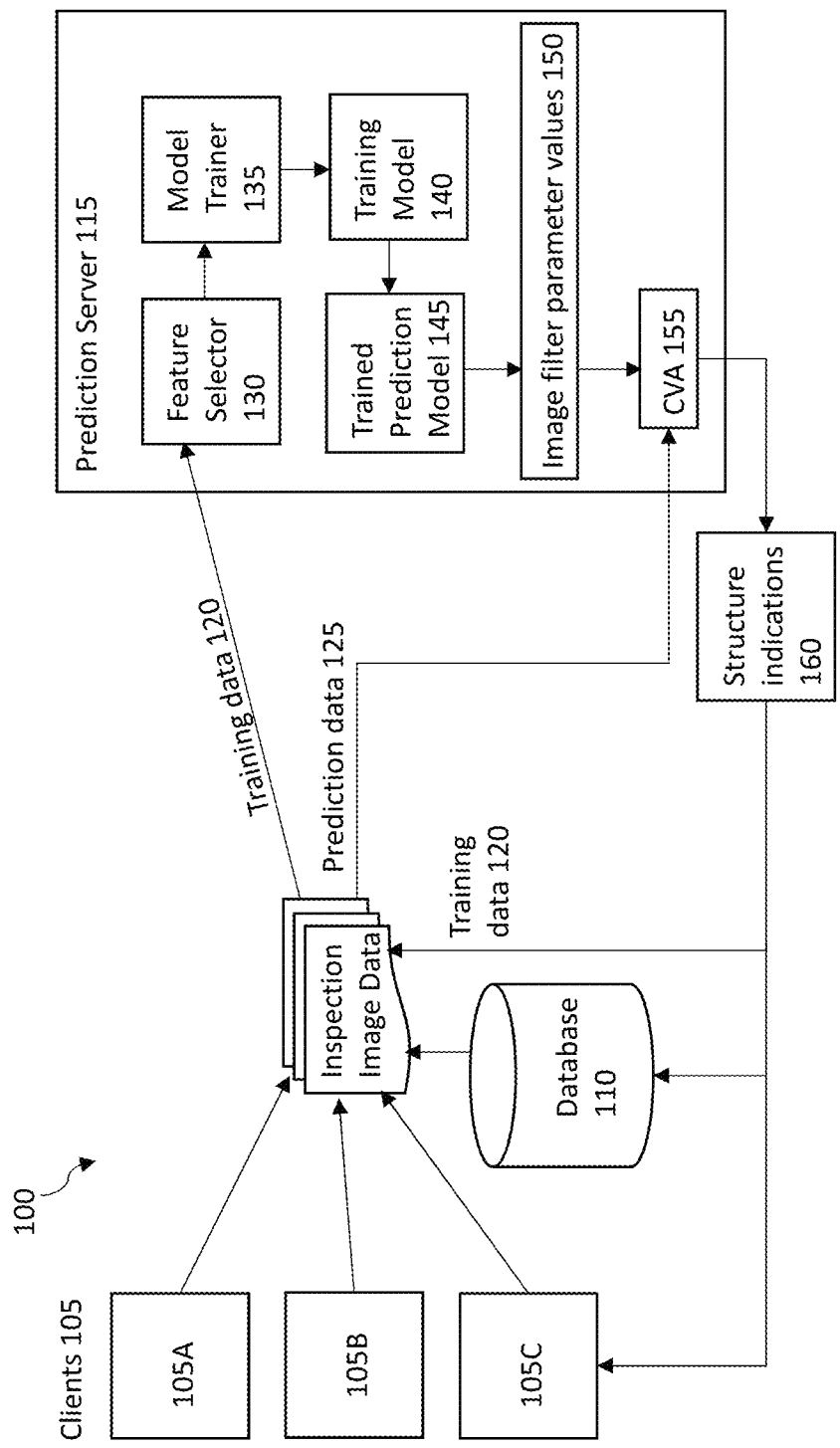
FIG. 1 illustrates an exemplary embodiment of a system for detecting structures in inspection image data according to the subject matter described herein.

It is noted that the drawings are not necessarily to scale. The drawings are intended to depict only typical aspects of the subject matter disclosed herein, and therefore should not be considered as limiting the scope of the disclosure.

DETAILED DESCRIPTION

Object inspection can be performed to assess the quality of an object, such as defects which can be contained on or within the object. Inspection image data can be evaluated to determine structures on or within the objects and defects of the structures. Computer vision algorithms can be employed to process inspection image data and to determine aspects of the inspected object or its structures. Computer vision algorithms (CVA) can implement image filters that can be used to characterize inspection image data. Often CVAs include an algorithm configured to implement the image filter as a formula using source code. A variety of parameters of the image filter can be fixed or pre-calculated to determine one or more structures in image data the CVA is applied to. For greater precision and accuracy of structure detection, the parameters of the CVA must be tuned or adjusted manually by a user, which can be time-consuming and required specialized personnel resources. The additional time can be exacerbated because the parameters can cross-influence one another. In addition, extra tuning time can be required because the parameter value determinations can be affected by the input type and can depend on the object type and quality of the inspection image data. The problem can require additional time and resources when tuning the CVA for a new object, as re-training of an existing CVA can be required.

Structure detection using a CVA implemented as a predictive model in a machine learning process utilizing deep learning multilayer artificial neuronal networks can require large amounts of training data. Each instance of the training data must be accurately and manually labeled. This approach can also be very time-consuming and can require additional variations of labeled training data to adequately train the predictive model for a new object type or inspection type.

Thus, a need exists for an efficient and less time-consuming way to accurately perform structure detection using inspection image data via CVAs. Rather than implementing the CVA as a predictive model in a machine learning process, the systems, methods, and computer-readable mediums provided herein can implement a predictive model trained to generate one or more image filter parameter values for use in a CVA. The approach can provide reduce training time, need for experienced personnel, and can be more fully automated than CVAs implemented purely in a machine learning process. For example, a smaller quantity of inspection image data can be used to train the predictive model described herein and the inspection image data used for training can include a larger variety of structure types, regions of interest, and quality. In addition, the training data can be labeled by less skilled users.

Another benefit is that the predictive model configured to determine the image filter parameter values for use in the CVA can include an automated parameter finding routine that can estimate parameter values for a variety of parameters associated with multiple image filters implemented by the CVA. The automated parameter finding routine can change the parameter automatically, compare training data labels with observed structures separately for different structure types, and can select the best parameter value. The automated parameter finding routing can operate iteratively. Once found, the best parameter values can be saved and automatically applied during inspection of other structures, other objects, or in other regions of interest associated with the same structure or object. This automated operation can increase inspection time without requiring human resources.

Once the predictive model has been trained and deployed, the predicted image filter parameter values can be applied to a CVA used to perform analysis of new inspection image data and structures can be determined in the new inspection image data. The structures and indications of the structures can be provide to a user via a display. The user can review the indications, and in some embodiments, the user can adjust the indications such that the annotated inspection image data can be then provided back to the machine learning process as training data to generate new image filter parameter values based on the refined inspection image data. Advantageously, the feedback of the refined inspection image data can enable faster retraining and generation of more accurate image filter parameter values that can be used for inspection of new objects or structures.

FIG. 1 is a diagram illustrating an example architecture of a system 100 for detecting structures in inspection image data and providing indications of the detected structures. The system 100 includes clients 105, database 110, and server 115, which can be communicatively coupled over a network.

As shown in FIG. 1, the system 100 includes clients 105, e.g., clients 105A-105C. For example, client 105A can include a laptop configured with a web-browser to display 2D or 3D inspection data acquired during inspection of an object, such as a battery. Client 105B can include a training image data used in a machine learning process to train a predictive model configured to generate image filter parameters for use in a computer vision algorithm based on annotations in the training image data. The computer vision algorithm can be configured to receive inspection image data and to determine indications of structures that can be present within regions of interest of the inspection image data. Client 105C can include optimized image filters, optimized image filter parameters, and optimized image filter parameter values that can be further used in the machine learning process to train the predictive model or can be used to refine the operation of the computer vision algorithm to detect structures of the object being inspection that is captured in the inspection image data. Inspection image data, training data, annotation data, image filter data, image filter parameter data, image filter parameter value data, and data associated with one or more optimization techniques can be stored in a database, for example database 110, and can be transmitted to prediction server 115.

As further shown in FIG. 1, inspection image data can be transmitted from the clients 105 and/or from the database 110 to the prediction server 115. In some embodiments, the inspection image data includes training input 120 that is transmitted to the prediction server 115 for use in a machine learning process. The training input 120 is used to train a machine learning algorithm in a machine learning process in order to generate a training model capable of predicting image filter parameter values for image filters parameters configured in a computer vision algorithm 155 based on one or more optimization techniques that can be applied to the training input 120. In some embodiments, the outputs of the computer vision algorithm 155 can be provided as training input to the prediction server 115 in order to further train the training model 140.

In some embodiments, the inspection image data includes prediction data 125 that can be transmitted to a prediction server 115 as inputs to the computer vision algorithm that can be configured with image filter parameter values generated via the trained prediction model 145 trained in the machine learning process using the training input 120.

The inspection image data can include computed tomography (CT) data associated with objects being inspected. In some embodiments, the inspection image data can include X-ray data. The objects can include structures found within regions of interest of the inspection image data. For example, in the case of a battery, the inspection image data can include structures such as electrodes, which can include cathodes, anodes, or other similar portions of the battery. In some embodiments, the inspection image data can include one or more slices of image data of the object being inspected. In some embodiments, the structures can be surface structures of the object being inspected. In some embodiments, the structures can include linear structures. The inspection image data can include two-dimensional (2D) inspection image data, three-dimensional (3D) inspection image data, and four-dimensional (4D) inspection image data.

The inspection image data can include one or more irregularities of the structure. For example, the inspection image data can include a void, a pore, or a particle of the structure. An irregularity can be, for example, a crack in or a deformity of the structure. A void can be, for example, an air bubble. A pore can be, for example, a dent, a depression, or surface anomaly of the structure. A particle can be, for example, a piece of first material that is included in a second material of the structure.

The client device 105 can be coupled to the prediction server 115 via a network. The network can include, for example, any one or more of a personal area network (PAN), a local area network (LAN), a campus area network (CAN), a metropolitan area network (MAN), a wide area network (WAN), a broadband network (BBN), the Internet, and the like. Further, the network can include, but is not limited to, any one or more of the following network topologies, including a bus network, a star network, a ring network, a mesh network, a star-bus network, tree or hierarchical network, and the like.

As shown in FIG. 1, the system 100 includes a prediction server 115 to receive the inspection image data and generate image filter parameter values 150 for use in a computer vision algorithm 155 that can be applied to the inspection image data to determine indications 160 of structures in an object included in the inspection image data. In broad overview, the prediction server 115 functions in the training aspect of a machine learning process to receive inspection image data as training input and generate a training model 140 for use in predicting image filter parameter values for use in the computer vision algorithm 155 used to determine structures and indications of structures 160 of objects that are included in prediction data 125. The prediction server 115 includes a feature selector 130, which is used in the training aspect of the machine learning process to select subsets of features in the inspection image data. The prediction server 115 also includes a model trainer 135 which uses a selected machine learning algorithm to process the selected subsets of features as inputs and generate a new training model 140 which can be subsequently used outside of the machine learning process to predict image filter parameter values 150 for use in the computer vision algorithm 155 to detect and determine structures 160 in the inspection image data received as prediction data 125.

As shown in FIG. 1, the prediction server 115 includes a feature selector 130. During the training aspect of the machine learning process, the feature selector 130 receives inspection image data and selects subsets of features in the inspection image data which are used as training input to train the selected machine learning algorithm to generate image filter parameter values associated with one or more image filter parameters used in the computer vision algorithm 155. For each selected subset of features in the training input 120, the selected machine learning algorithm can be trained to predict image filter parameter values associated with the subset of features for which the selected machine learning algorithm was trained. The trained machine learning algorithm can then be output as a new trained model (e.g., training model 140), which can then be subsequently applied to inspection image data (e.g., prediction data input 125) to determine structures and indications of structures 160 corresponding to objects included in the inspection image data 125.

During the machine learning process, the feature selector 130 provides the selected subset of features to the model trainer 135 as inputs to a machine learning algorithm to generate one or more training models in a machine learning process utilizing deep learning multilayer artificial neuronal networks. A wide variety of machine learning algorithms can be selected for use including algorithms such as support vector regression, ordinary least squares regression (OLSR), linear regression, logistic regression, stepwise regression, multivariate adaptive regression splines (MARS), locally estimated scatterplot smoothing (LOESS), ordinal regression, Poisson regression, fast forest quantile regression, Bayesian linear regression, neural network regression, decision forest regression, boosted decision tree regression, artificial neural networks (ANN), Bayesian statistics, case-based reasoning, Gaussian process regression, inductive logic programming, learning automata, learning vector quantization, informal fuzzy networks, conditional random fields, genetic algorithms (GA), Information Theory, support vector machine (SVM), Averaged One-Dependence Estimators (AODE), Group method of data handling (GMDH), instance-based learning, lazy learning, and Maximum Information Spanning Trees (MIST).

The prediction server 115 also includes a model trainer 135. In some embodiments, the model trainer 135 can be included in the prediction server 115. In other embodiments, the model trainer 135 can be located remotely from the prediction server 115. During the training aspect of the machine learning process, the model trainer 135 receives the training input including the selected subsets of features from the feature selector 130 and iteratively applies the subsets of features to the previously selected machine learning algorithm to assess the performance of the algorithm. As the machine learning algorithm processes the training input, the model trainer 135 learns patterns in the training input that map the machine learning algorithm variables to the target output data (e.g., the predicted sequences of actions) and generates a training model that captures these relationships. For example, as shown in FIG. 1, the model trainer 135 outputs the training model 140. As further shown in FIG. 1, the training model 140 that is output can be a trained prediction model 145.

As further shown in FIG. 1, the prediction server 115 includes a trained prediction model 145. The trained prediction model 145 is a model or algorithm that has been generated as a result of the model training performed during the training aspect of the machine learning process. Once trained, the trained prediction model 145 can operate outside of a machine learning process to receive inspection image data as prediction data 125 and determine image filter parameter values 150 that can be applied to a computer vision algorithm 155. The computer vison algorithm 155 can be configured to generate indications of structures 160 and provide them for visualization on a client 105, such as a display of client 105C. The indications of structures 160 can also be provided for data storage, such as to the database 110. For example, the trained prediction model 145 outputs indications 160 of electrode structures of a battery that is included in a region of interest of the inspection image data that is received by the prediction server 115 as prediction data 125 from client 105A.

The structure indications 160 can include a variety of data or graphical indications associated with structures of the object being inspected. In some embodiments, the object can be an electrical component, such as a battery. For example, the object can be a lithium-ion battery, a nickel-metal hydride battery, or a nickel-cadmium battery. The indications 160 can include one or more structures, a portion of a structure, a region of interest, a defect, a position, or an alignment of a structure. In some embodiments, the region of interest can include a cathode of a battery, an anode of a battery, a housing of a battery, a volume between a cathode of a battery and an anode of a battery, a centerline of a cathode of a battery, a centerline of an anode of a battery, and a profile of a shape of a battery. A variety of non-limiting objects and structures included in the objects can be envisioned for inspection using the subject matter described herein. In some embodiments, the indications 160 can be provided as overlay data laid atop image data including the structure and at least a portion of the object. In some embodiments, the indications 160 can include alerts, notifications, measurement data, annotation data, or graphical affordances identifying the structures.

Figure 2:
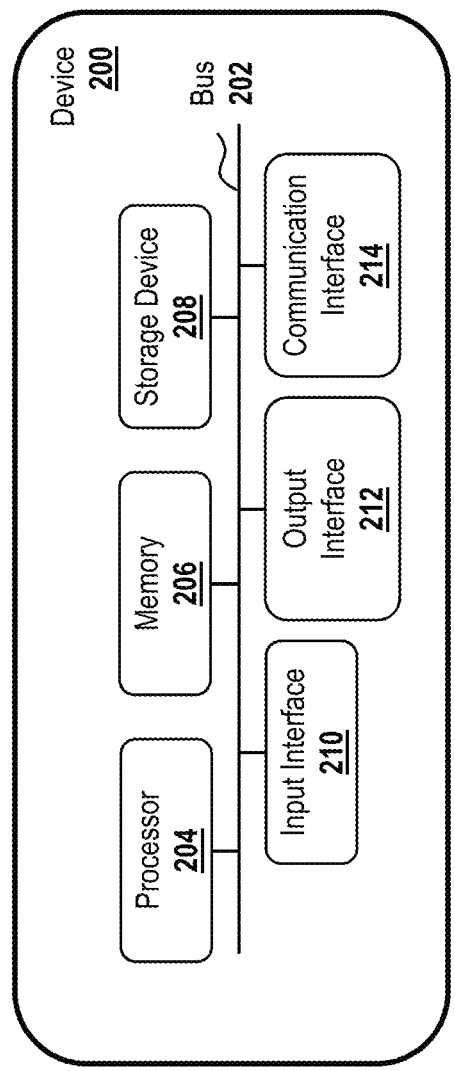
FIG. 2 illustrates components of one or more devices and/or one or more systems of FIG. 1 according to the subject matter described herein.

Referring now to FIG. 2, illustrated is a schematic diagram of a device 200. In some embodiments, the device 200 can correspond to client device 105 described in relation to FIG. 1. In some embodiments, the device 200 can correspond to server 115 described in relation to FIG. 1. In some embodiments, the system 100 shown in FIG. 1 can be configured in the device 200. As illustrated in FIG. 2, device 200 includes processor 204, memory 206, storage component 208, input interface 210, output interface 212, communication interface 214, and bus 202. As shown in FIG. 2, device 200 includes bus 202, processor 204, memory 206, storage component 208, input interface 210, output interface 212, and communication interface 214.

Bus 202 includes a component that permits communication among the components of device 200. In some embodiments, processor 204 is implemented in hardware, software, or a combination of hardware and software. In some examples, processor 204 includes a processor (e.g., a central processing unit (CPU), a graphics processing unit (GPU), an accelerated processing unit (APU), and/or the like), a microphone, a digital signal processor (DSP), and/or any processing component (e.g., a field-programmable gate array (FPGA), an application specific integrated circuit (ASIC), and/or the like) that can be programmed to perform at least one function. Memory 206 includes random access memory (RAM), read-only memory (ROM), and/or another type of dynamic and/or static storage device (e.g., flash memory, magnetic memory, optical memory, and/or the like) that stores data and/or instructions for use by processor 204.

Storage component 208 stores data and/or software related to the operation and use of device 200. In some examples, storage component 208 includes a hard disk (e.g., a magnetic disk, an optical disk, a magneto-optic disk, a solid state disk, and/or the like), a compact disc (CD), a digital versatile disc (DVD), a floppy disk, a cartridge, a magnetic tape, a CD-ROM, RAM, PROM, EPROM, FLASH-EPROM, NV-RAM, and/or another type of computer readable medium, along with a corresponding drive.

Input interface 210 includes a component that permits device 200 to receive information, such as via user input (e.g., a touchscreen display, a keyboard, a keypad, a mouse, a button, a switch, a microphone, a camera, and/or the like). Output interface 212 includes a component that provides output information from device 200 (e.g., a display, a speaker, one or more light-emitting diodes (LEDs), and/or the like).

In some embodiments, communication interface 214 includes a transceiver-like component (e.g., a transceiver, a separate receiver and transmitter, and/or the like) that permits device 200 to communicate with other devices via a wired connection, a wireless connection, or a combination of wired and wireless connections. In some examples, communication interface 214 permits device 200 to receive information from another device and/or provide information to another device. In some examples, communication interface 214 includes an Ethernet interface, an optical interface, a coaxial interface, an infrared interface, a radio frequency (RF) interface, a universal serial bus (USB) interface, a Wi-Fi® interface, a cellular network interface, and/or the like.

In some embodiments, device 200 performs one or more processes described herein. Device 200 performs these processes based on processor 204 executing software instructions stored by a computer-readable medium, such as memory 205 and/or storage component 208. A computer-readable medium (e.g., a non-transitory computer readable medium) is defined herein as a non-transitory memory device. A non-transitory memory device includes memory space located inside a single physical storage device or memory space spread across multiple physical storage devices.

In some embodiments, software instructions are read into memory 206 and/or storage component 208 from another computer-readable medium or from another device via communication interface 214. When executed, software instructions stored in memory 206 and/or storage component 208 cause processor 204 to perform one or more processes described herein. Additionally or alternatively, hardwired circuitry is used in place of or in combination with software instructions to perform one or more processes described herein. Thus, embodiments described herein are not limited to any specific combination of hardware circuitry and software unless explicitly stated otherwise.

Memory 206 and/or storage component 208 includes data storage or at least one data structure (e.g., a database and/or the like). Device 200 is capable of receiving information from, storing information in, communicating information to, or searching information stored in the data storage or the at least one data structure in memory 206 or storage component 208. In some examples, the information includes network data, input data, output data, or any combination thereof.

In some embodiments, device 200 is configured to execute software instructions that are either stored in memory 206 and/or in the memory of another device (e.g., another device that is the same as or similar to device 200). As used herein, the term "module" refers to at least one instruction stored in memory 206 and/or in the memory of another device that, when executed by processor 204 and/or by a processor of another device (e.g., another device that is the same as or similar to device 200) cause device 200 (e.g., at least one component of device 200) to perform one or more processes described herein. In some embodiments, a module is implemented in software, firmware, hardware, and/or the like.

The number and arrangement of components illustrated in FIG. 2 are provided as an example. In some embodiments, device 200 can include additional components, fewer components, different components, or differently arranged components than those illustrated in FIG. 2. Additionally or alternatively, a set of components (e.g., one or more components) of device 200 can perform one or more functions described as being performed by another component or another set of components of device 200.

Figure 3:
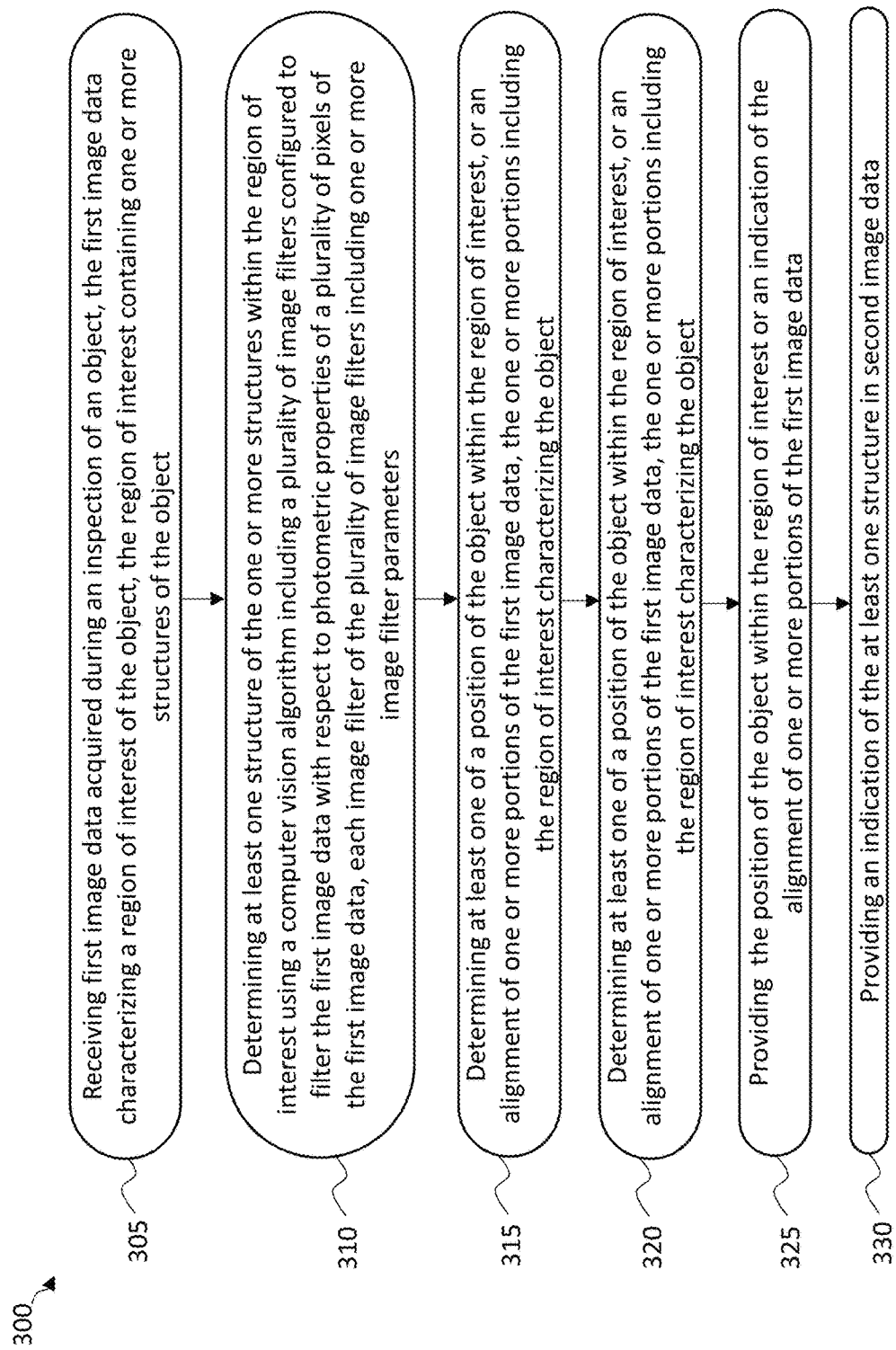
FIG. 3 is a flowchart illustrating one exemplary embodiment of a method for detecting structures in inspection image data according to the subject matter described herein.

FIG. 3 is a flow diagram illustrating an exemplary embodiment of a process 300 for detecting structures in inspection image data using the system 100 as shown and described in relation to FIG. 1. In certain aspects, embodiments of the process 300 can include greater or fewer operations than illustrated in FIG. 3 and the operations can be performed in a different order than illustrated in FIG. 3.

In operation 305, a data processor can receive first image data acquired during an inspection of an object. The inspection can be performed using X-ray or computed tomography and the object can be any object for which an inspection of internal structures can be performed. The first image data can include multidimensional inspection image data, such as 2D inspection image data, 3D inspection image data, 4D inspection image data, or the like. The inspection image data can include linear data, surface data, and volumetric data.

The first image data can characterize a region of interest of the object and the region of interest can include one or more structures. For example, the object can be a battery and the image data can include an electrode, such as an anode or a cathode, of the battery. In some embodiments the battery can include a lithium-ion battery, a nickel-metal hydride battery, or a nickel-cadmium battery. The region of interest can include a cathode of a battery, an anode of a battery, a housing of a battery, a volume between a cathode of a battery and an anode of a battery, a centerline of a cathode of a battery, a centerline of an anode of a battery, and a profile of a shape of a battery.

At operation 310, the data processor and a CVA can determine at least one structure of the one or more structures that are present within the region of interest. The CVA can be configured with a plurality of image filters that can filter the first image data with respect to photometric properties of a plurality of pixels included in the first image data. Each image filter can include one or more image filter parameters.

The CVA can be configured to generate profile data that can be associated with a portion of the plurality of pixels included in the first image data. The portion can correspond to a structure present within the region of interest, such as a cathode or an anode of the battery being inspected. The profile data can include photometric data, tip detection data, particle detection data, or void detection data. For example photometric data can include gray-scale data corresponding to light intensity (e.g., brightness) or an amount of luminous flux of the pixels. Tip detection data can include profile data derived from the plurality of pixel data as well as tip position data derived from profile data. Particle detection data can include profile area data, particle area data, and center of mass data. Void detection data can include profile area data, void area data, and center of mass data.

At operation 315, the data processor can determine a position of the object within the region of interest. The position of the structure can also be determined within the region of interest. For example, the position of the object or the structure can be determined with respect to a coordinate value system corresponding to pixel locations of the first image data.

At 320, the data processor can alternatively determine an alignment of one or more portions of the first image data. For example, an alignment of a terminal portion of an electrode can be determined with respect to a casing of a battery containing the electrode. The alignment can be determined with respect to a coordinate value system associated with pixel location of the first image data.

At 325, the data processor can provide the position of the object determined at 315 or the alignment of the portions of the first image data determined at 320. The position or the alignment can be provided via a display. In some embodiments, the position or the alignment can be provided as numerical values and stored in a memory or a database.

At 330, the data processor can provide an indication of the at least one structure in second image data. The indication can include the structure, the region of interest, and the object. In some embodiments, the indication can include an overlay marking the structure. The second image data can include multidimensional image data, such as 2D image data, 3D image data, 4D image data, or the like. The second image data can include linear data, surface data, and volumetric data.

Figure 4:
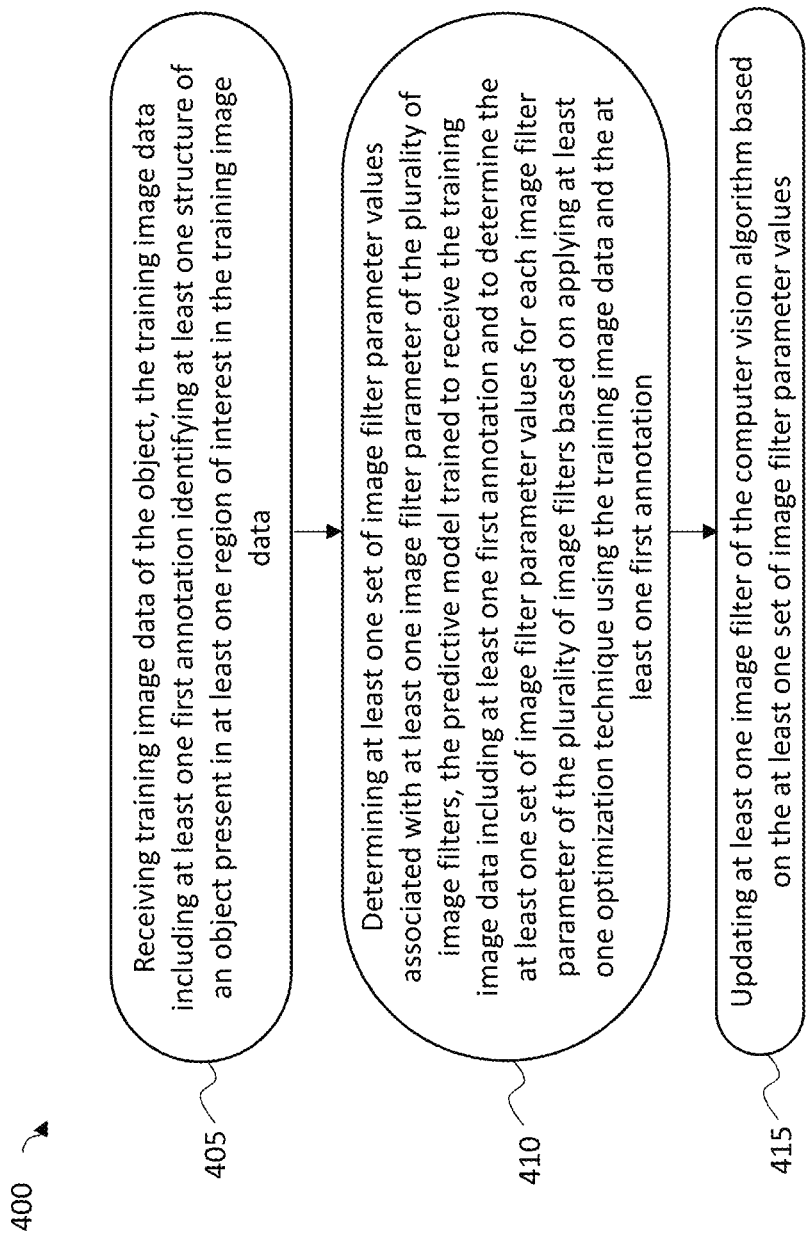
FIG. 4 is a flowchart illustrating one exemplary embodiment of a method for determining at least one structure within a region of interest included in inspection image data according to the subject matter described herein.

FIG. 4 is a flow diagram illustrating an exemplary embodiment of a process 400 for determining at least one structure within a region of interest included in the first image data (e.g., inspection image data). The process 400 can correspond to operation 310 described in relation to FIG. 3 and can be performed using the system 100 as shown and described in relation to FIG. 1. In certain aspects, embodiments of the process 400 can include greater or fewer operations than illustrated in FIG. 4 and the operations can be performed in a different order than illustrated in FIG. 4. The process 400 can be configured in a machine learning process described herein to generate image filter parameter values based on training data including inspection image data. The generated image filter parameter values can be applied to a CVA, such as the CVA used in operation 310, to determine indications of structures within an inspected object for which inspection image data has been received.

At 405, the data processor can receive training image data of the object. The training image data can include at least one first annotation identifying at least one structure of an object present in at least one region of interest in the training image data. The at least one first annotation can be manually applied and can denote the structure. For example, the annotation can identify the center line of an electrode, a casing of the battery, an anode, a cathode, or a terminal end of a battery or electrode. The training image data can also include or otherwise characterize a region of interest of an object and the region of interest can include one or more structures. For example, the object can be a battery and the image data can include an electrode, such as an anode or a cathode, of the battery. In some embodiments the battery can include a lithium-ion battery, a nickel-metal hydride battery, or a nickel-cadmium battery. The region of interest can include a cathode of a battery, an anode of a battery, a housing of a battery, a volume between a cathode of a battery and an anode of a battery, a centerline of a cathode of a battery, a centerline of an anode of a battery, and a profile of a shape of a battery.

At 410, the data processor and a predictive model can determine at least one set of image filter parameter values associated with at least one image filter parameter configured in the plurality of image filter parameters implemented in the CVA used in operation 310. The predictive model can be trained to receive trained image data including annotations corresponding to structures within the trained image data and the object. The predictive model can be trained to determine the set of image filter parameter values based on applying optimization techniques using the training image data and the annotation. For example, the predictive model can be trained to determine image filter parameter values for parameters associated with a mean profile image filter. The image filter parameters can include a mean profile image filter, a line tracking image filter, a stop criteria image filter, a 2D area structure image filter, a 2D center area structure image filter, a 3D surface patch image filter, a 3D center surface patch image filter, a 3D volumetric structure image filter, and a 3D center volumetric structure image filter.

In some embodiments, the set of image filter parameter values can be determined to be a set of convolution filter parameters that can be configured by the optimization techniques to maximize the convolution result when applying the convolution operation of the image filter with the plurality of pixels of the training image data. The set of image filter parameter values is determined for example to maximize the convolution results in the center line of one of the cathode or anode structure and minimize it in the neighborhood of the center line of one of the cathode or anode structure. The set of convolution filter parameters can include a set of one-dimensional parameter values or a two-dimensional array of parameter values.

In some embodiments, the predictive model can be trained to determine image filter parameter values for parameters associated with a mean profile image filter. The mean profile image filter can be used to determine the position of anode center line or cathode center line by applying the Normalized Cross-Correlation (NCC) operation or Mean Squared Difference (MSD) operation to the profile derived from the plurality of pixels in the inspection image data and mean profile data.

In some embodiments, the predictive model can be trained to determine image filter parameter values for parameters associated with a line tracking image filter. The line tracking image filter can be used to iteratively determine the plurality of pixels belonging to the cathode center line or anode center line by applying a convolution image filter or a mean profile image filter to a next predicted position on the center line, and thus determining, based on the filter output, the next pixel of the plurality of pixels belonging to the cathode center line or anode center line. In some embodiments, the predictive model can be trained to determine image filter parameter values for parameters associated with a stop criteria image filter. The stop criteria image filter can be configured to use the tip detection data to determine the tip position and thus to stop iterative operation the line tracking image filter.

In some embodiments, the predictive model can be trained to determine image filter parameter values for parameters associated with a 2D area structure image filter. The 2D area structure image filter can be configured to determine an area of 2D structures such as a void or an inclusion in an 2D inspection image data. In some embodiments, the predictive model can be trained to determine image filter parameter values for parameters associated with a 2D center area structure image filter. The 2D center area structure image filter can be configured to determine a center point position of an area of a 2D structure in a 2D inspection image data. In some embodiments, the predictive model can be trained to determine image filter parameter values for parameters associated with a 3D surface patch image filter. The 3D surface patch image filter can be configured to determine a surface portion describing the interface between the object and the air or between two different materials of the object. In some embodiments, the predictive model can be trained to determine image filter parameter values for parameters associated with a 3D center surface patch image filter. The 3D center surface patch image filter can be configured to determine a point on interface between the object and the air or between two different materials of the object. In some embodiments, the predictive model can be trained to determine image filter parameter values for parameters associated with a 3D volumetric structure image filter. The 3D volumetric structure image filter can be configured to determine a volume of a 3D structures such as a void or an inclusion in an 3D inspection image data. In some embodiments, the predictive model can be trained to determine image filter parameter values for parameters associated with a 3D center volumetric structure image filter. The 3D center volumetric structure image filter can be configured to determine a center point position of a volume of a 3D structure in a 3D inspection image data.

The optimization technique can include a grid search technique, a random search technique, a Levenberg-Marquardt technique, a gradient search technique, a Bayesian optimization technique, or a combination of two or more optimization techniques Responsive to providing the indication of the structure in the second image data at operation 330, the indication can be used in a feedback loop to refine the training image data. For example, the indication provided in the second image data can be modified with at least one annotation. The modification can be provided in regard to a previously determined structure as well as an annotation that is provided in regard to an additional or new structure. The second image data can then be included in the training image data. The second image data can include the annotation of the at least one structure. The region of interest of the object can then be characterized. For example, the characterization can include identifying or characterizing a defect in the region of interest. The defect can include a pit, a void, a burr, a crack, a particle or foreign substance, or the like. In some embodiments, the characterizing can include characterizing the region of interest as defective. For example, based on the presence of the defect, the region of interest can be characterized as defective. The set of image filter parameters determined at operation 410 can be determined based on training the predictive model using the training image data that includes the second image data and the annotation of the structure.

At 415, at least one image filter of the CVA can be updated based on the set of image filter parameter values determined in operation 410. In this way, a feedback loop is created to enhance the accuracy of the CVA based on the results of the trained predictive model.

Figure 5:
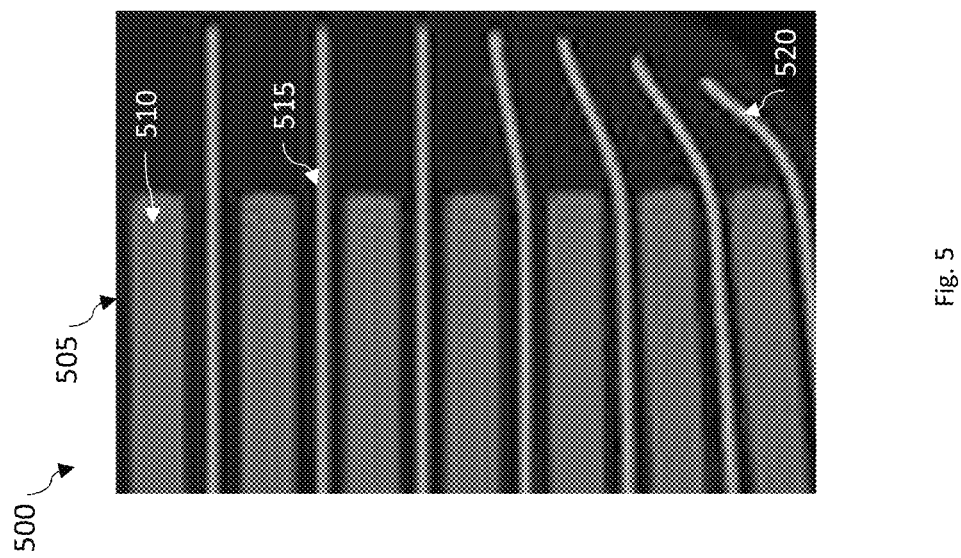
FIG. 5 is an image of inspection image data for use in detecting structures therein according to the subject matter described herein.

FIG. 5 is an image of inspection image data 500 for use in detecting structures therein according to the subject matter described herein. The inspection image data 500 can include CT slice (e.g., 2D) data of an object including one or more structures. In the embodiment shown in FIG. 5 the object can include a battery and the one or more structures of the object can include anodes and cathodes of the battery. As shown in FIG. 5, the inspection image data can include a region of interest 505. Within the region of interest 505, a cathode 510 and an anode 515 can be present. In some embodiments, the region of interest 505 or one of the structures can be defective. For example, as shown in FIG. 5, an end 520 of the anode 515 can be bent and thus determined to be defective.

Figure 6:
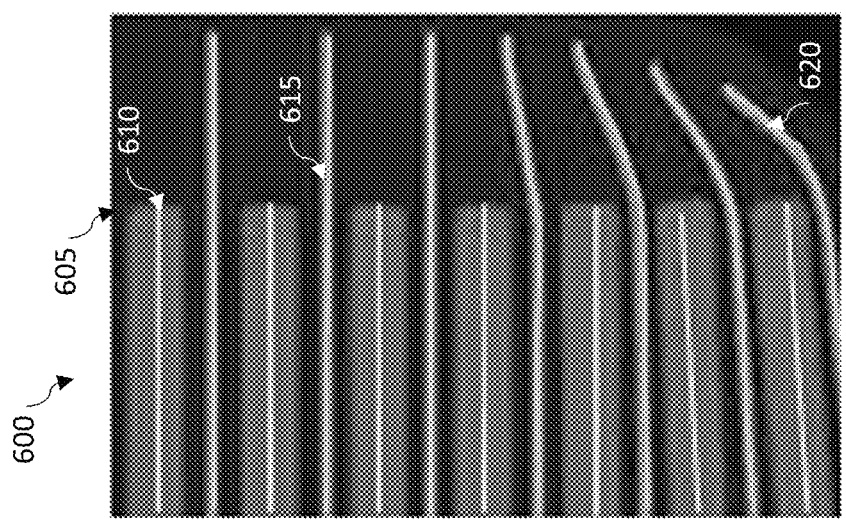
FIG. 6 is an image of inspection image data including indications of structures provided according to the subject matter described herein.

FIG. 6 is an image of inspection image data 600 including indications of structures provided according to the subject matter described herein. The inspection image data 600 can correspond to the inspection image data 500 of FIG. 5 and can further include one or more indications of structures within the object that are present in the region of interest. The indications can be generated by the CVA described herein (e.g., CVA 155) for which image filter parameter values can be generated via a predictive model in a machine learning process. For example, as shown in FIG. 6, the region of interest 605 can include an indication 610 identifying a centerline of a cathode. The indication 615 can identify a centerline of an anode. The indication 620 can indicate a defective anode.

Figure 7:
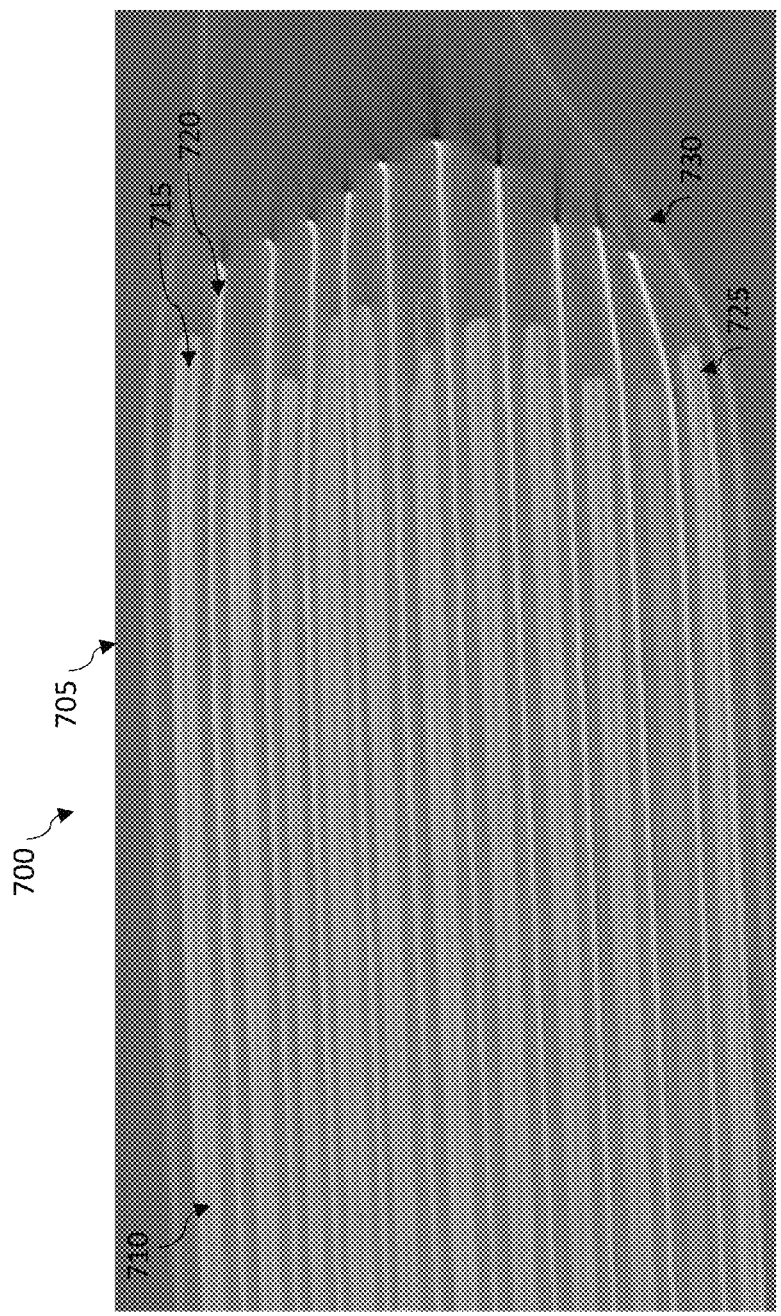
FIG. 7 is an image of inspection image data of a battery including an indication of a cathode determined according to the subject matter described herein.

FIG. 7 is an image of inspection image data 700 of a region of interest 705 including a battery 710 including an indication of a cathode determined according to the subject matter described herein. As shown in FIG. 7, the region of interest 705 includes a portion of the battery 710. The battery 710 includes the cathode 715 and anode 720. An indication 725 is provided to identify a center line of one of the cathodes. The inspection image data 700 can also include a casing or shell 730 of the battery 710.

Figure 8A:
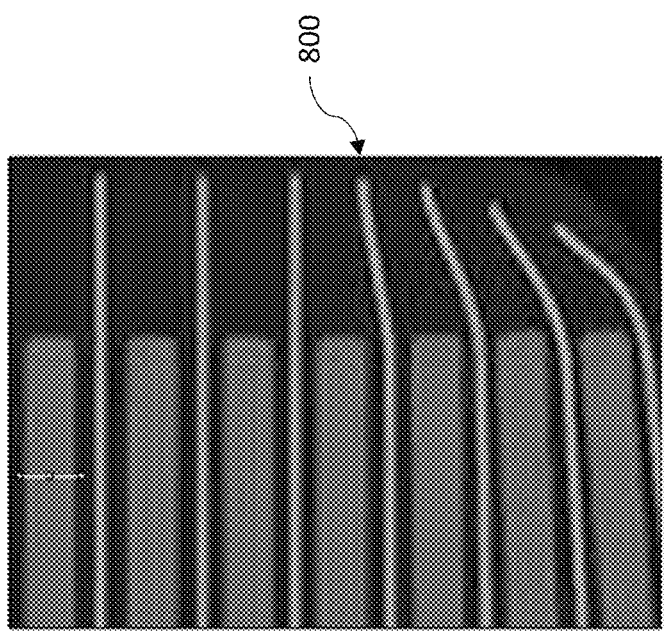
FIGS. 8A-8C are images of inspection image data of a battery for use in detecting a cathode therein according to the subject matter described herein.
Figure 8B:
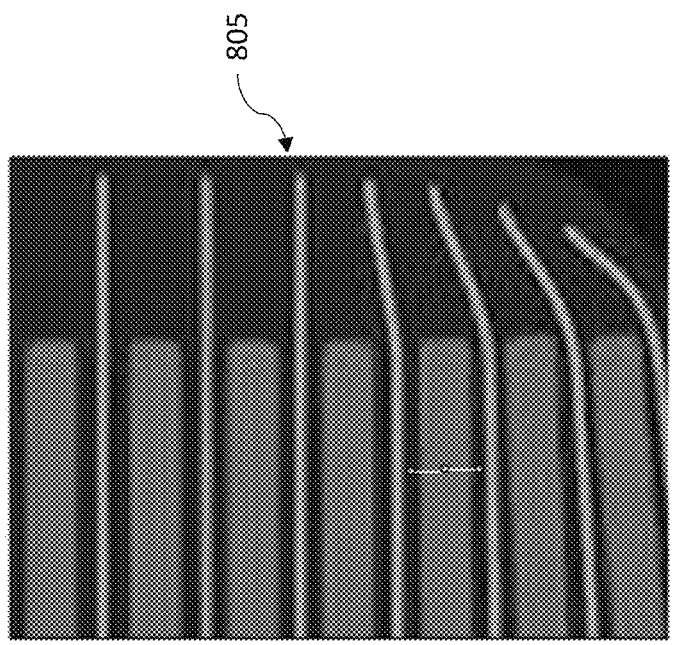
Figure 8C:
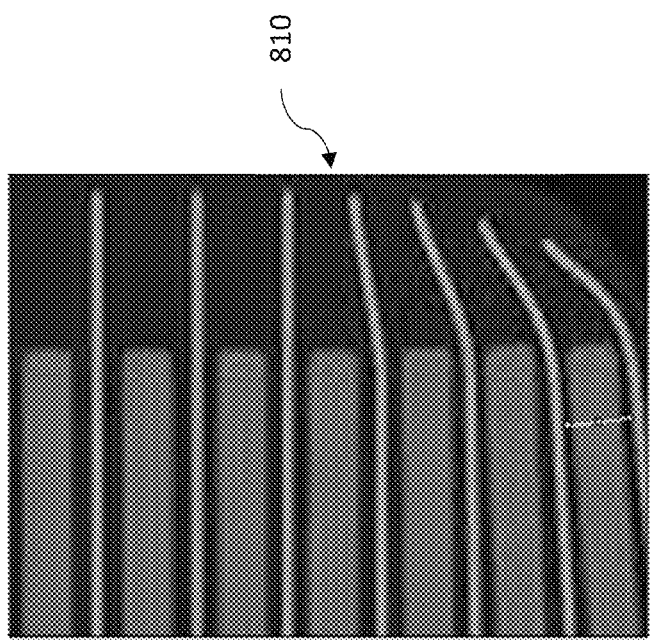

FIGS. 8A-8C are images of inspection image data of a battery for use in detecting a cathode therein according to the subject matter described herein. As shown in FIGS. 8A-8C, inspection image data 800, 805, and 810 are provided and can correspond to the inspection image data 700 described in relation to FIG. 7. The inspection image data 800, 805, and 810 can correspond to profile data of cathodes included in each of inspection image data 800, 805, and 810. The profile data can include photometric data that is acquired at one or more locations of the structure (e.g., the cathode). More specifically, the profile data can include gray-scale pixel information that is sampled from the inspection image data along a line typically drawn over the cathode. In this case, the profile consists of the gray-scale pixel information plotted over the position on said line. For example, FIG. 8A shows inspection image data 800 associated with the cathode at a first location along the length of the cathode. FIG. 8B shows inspection image data 805 associated with the cathode at a second location along the length of the cathode. FIG. 8C shows inspection image data associated with the cathode at a third location along the length of the cathode.

Figure 8D:
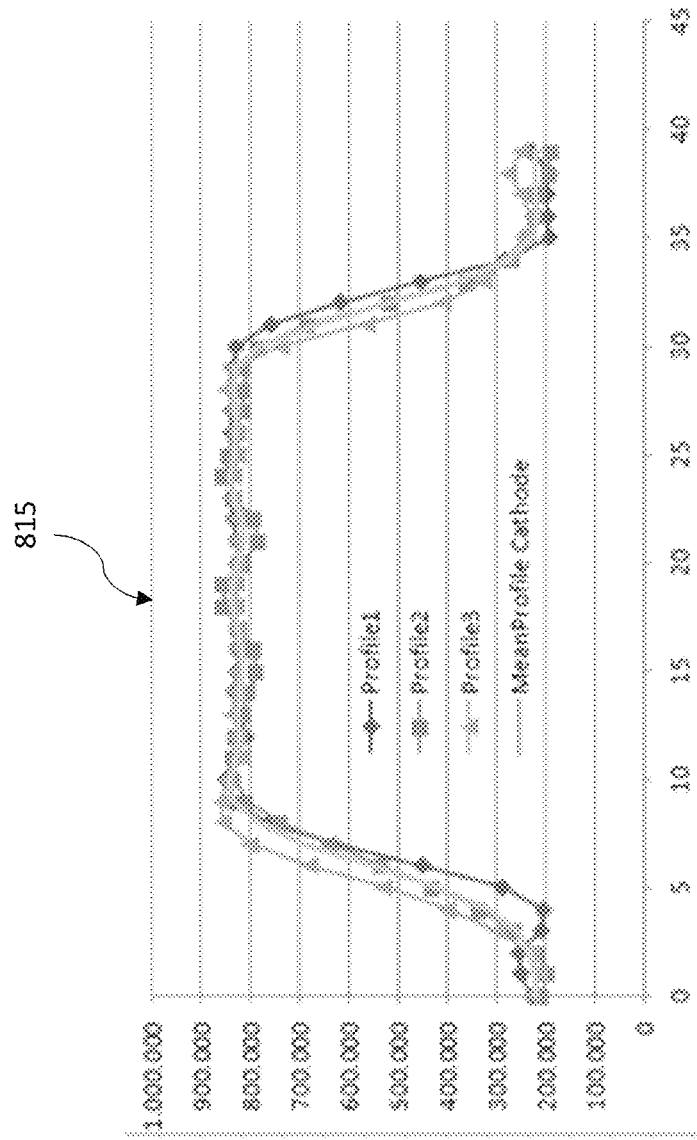
FIG. 8D is a plot of cathode photometric data according to the subject matter described herein.

FIG. 8D is a plot 815 of cathode profile data according to the subject matter described herein. The profile data included in the plot 815 can correspond to the various profiles determined in regard to inspection image data 800, 805, and 810. In addition, mean profile data for the cathode can also be provided.

Figure 9A:
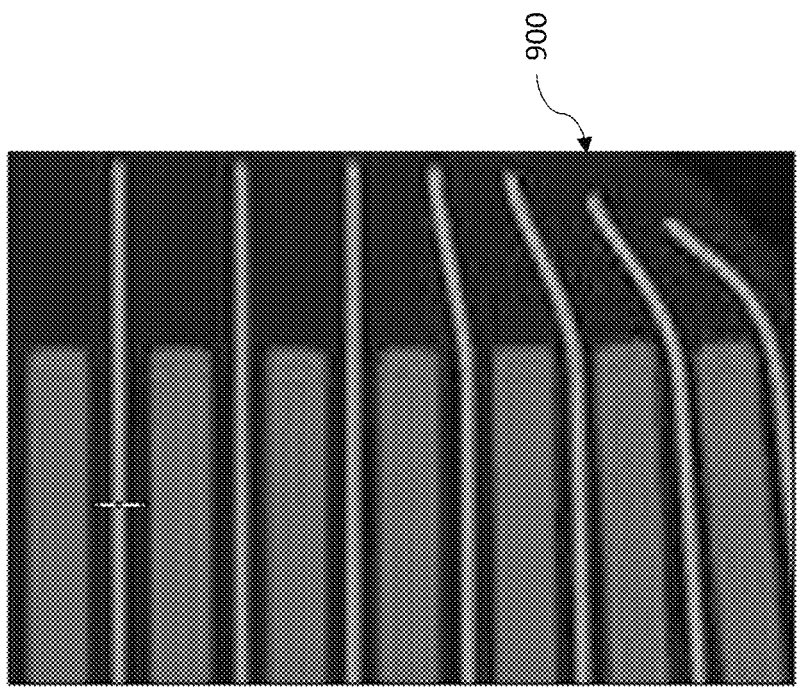
FIGS. 9A-9C are images of inspection image data of a battery for use in detecting an anode therein according to the subject matter described herein.
Figure 9B:
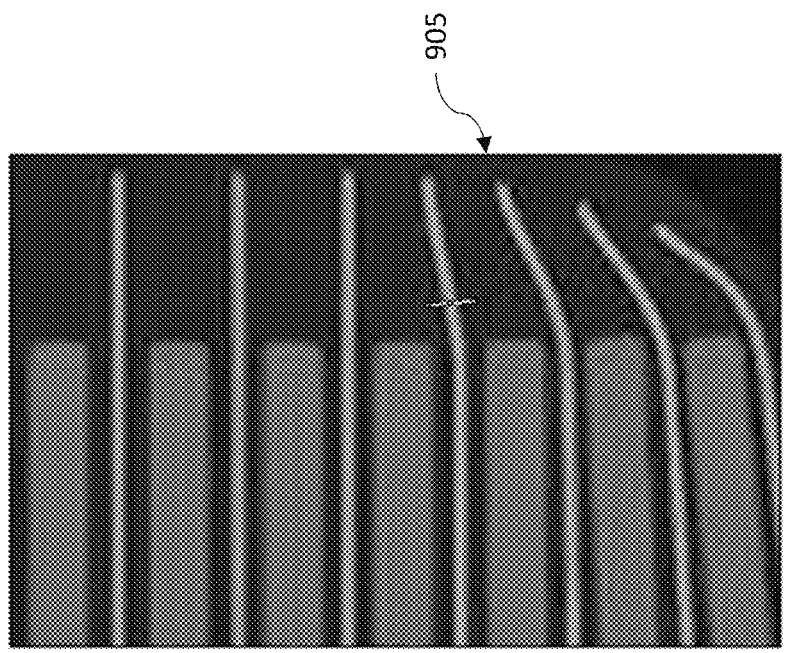
Figure 9C:
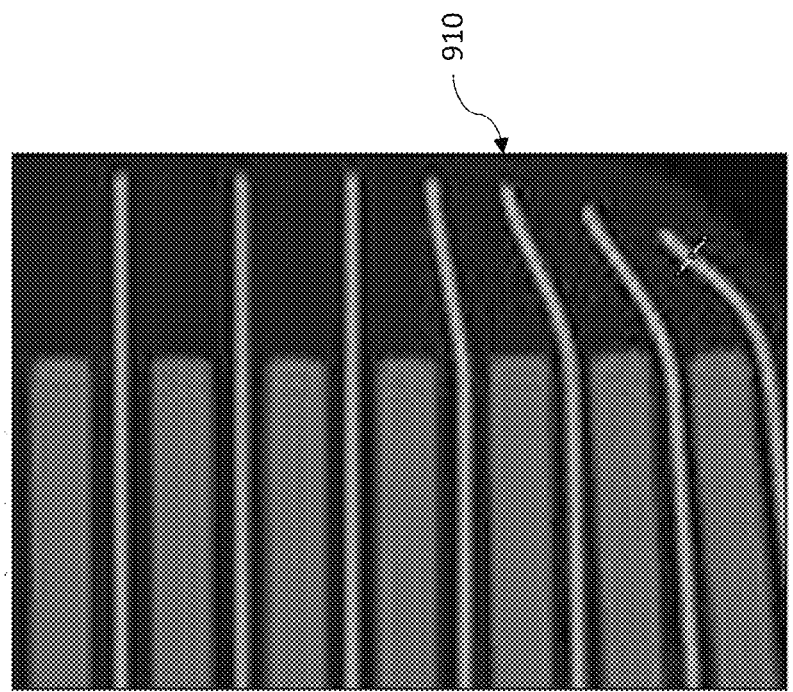

FIGS. 9A-9C are images of inspection image data of a battery for use in detecting an anode therein according to the subject matter described herein. As shown in FIGS. 9A-9C, inspection image data 900, 905, and 910 are provided and can correspond to the inspection image data 700 described in relation to FIG. 7. The inspection image data 900, 905, and 910 can correspond to photometric data of anodes included in each of inspection image data 900, 905, and 910. The profile data can include photometric data that is acquired at one or more locations of the structure (e.g., the anode). More specifically, the profile data can include gray-scale pixel information that is sampled from the inspection image data along a line typically drawn over the anode. In this case, the profile is consisting of the gray-scale pixel information plotted over the position on said line. For example, FIG. 9A shows inspection image data 900 associated with the anode at a first location along the length of the cathode. FIG. 9B shows inspection image data 905 associated with the anode at a second location along the length of the anode. FIG. 9C shows inspection image data associated with the anode at a third location along the length of the anode.

Figure 9D:
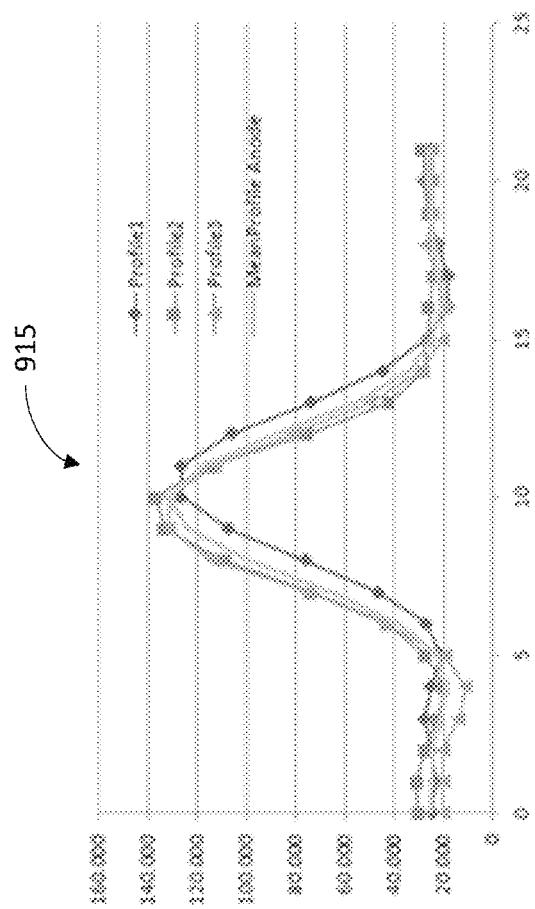
FIG. 9D is a plot of cathode photometric data according to the subject matter described herein.

FIG. 9D is a plot 915 of anode photometric data according to the subject matter described herein. The profile data included in the plot 915 can correspond to the various profiles determined in regard to inspection image data 900, 905, and 910. In addition, mean profile data for the anode can also be provided.

Exemplary technical effects of the methods, systems, and computer-readable medium described herein include, by way of non-limiting example, determining and generating image filter parameter values for use in a computer vision algorithm to detect and provide indications of structures within an object being inspected. The image filter parameter values can be generated by a predictive model in a machine learning process based on training the predictive model using inspection image data and annotated inspection image data. The improved structure detection systems and method provided herein can reduce inspection time, increase inspection accuracy, and enable detection of structures for new object types with minimal retraining time or manual input.

Certain exemplary embodiments have been described to provide an overall understanding of the principles of the structure, function, manufacture, and use of the systems, devices, and methods disclosed herein. One or more examples of these embodiments have been illustrated in the accompanying drawings. Those skilled in the art will understand that the systems, devices, and methods specifically described herein and illustrated in the accompanying drawings are non-limiting exemplary embodiments and that the scope of the present invention is defined solely by the claims. The features illustrated or described in connection with one exemplary embodiment can be combined with the features of other embodiments. Such modifications and variations are intended to be included within the scope of the present invention. Further, in the present disclosure, like-named components of the embodiments generally have similar features, and thus within a particular embodiment each feature of each like-named component is not necessarily fully elaborated upon.

The subject matter described herein can be implemented in analog electronic circuitry, digital electronic circuitry, and/or in computer software, firmware, or hardware, including the structural means disclosed in this specification and structural equivalents thereof, or in combinations of them. The subject matter described herein can be implemented as one or more computer program products, such as one or more computer programs tangibly embodied in an information carrier (e.g., in a machine-readable storage device), or embodied in a propagated signal, for execution by, or to control the operation of, data processing apparatus (e.g., a programmable processor, a computer, or multiple computers). A computer program (also known as a program, software, software application, or code) can be written in any form of programming language, including compiled or interpreted languages, and it can be deployed in any form, including as a stand-alone program or as a module, component, subroutine, or other unit suitable for use in a computing environment. A computer program does not necessarily correspond to a file. A program can be stored in a portion of a file that holds other programs or data, in a single file dedicated to the program in question, or in multiple coordinated files (e.g., files that store one or more modules, sub-programs, or portions of code). A computer program can be deployed to be executed on one computer or on multiple computers at one site or distributed across multiple sites and interconnected by a communication network.

The processes and logic flows described in this specification, including the method steps of the subject matter described herein, can be performed by one or more programmable processors executing one or more computer programs to perform functions of the subject matter described herein by operating on input data and generating output. The processes and logic flows can also be performed by, and apparatus of the subject matter described herein can be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processor of any kind of digital computer. Generally, a processor will receive instructions and data from a read-only memory or a random access memory or both. The essential elements of a computer are a processor for executing instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. Information carriers suitable for embodying computer program instructions and data include all forms of non-volatile memory, including by way of example semiconductor memory devices, (e.g., EPROM, EEPROM, and flash memory devices); magnetic disks, (e.g., internal hard disks or removable disks); magneto-optical disks; and optical disks (e.g., CD and DVD disks). The processor and the memory can be supplemented by, or incorporated in, special purpose logic circuitry.

To provide for interaction with a user, the subject matter described herein can be implemented on a computer having a display device, e.g., a CRT (cathode ray tube) or LCD (liquid crystal display) monitor, for displaying information to the user and a keyboard and a pointing device, (e.g., a mouse or a trackball), by which the user can provide input to the computer. Other kinds of devices can be used to provide for interaction with a user as well. For example, feedback provided to the user can be any form of sensory feedback, (e.g., visual feedback, auditory feedback, or tactile feedback), and input from the user can be received in any form, including acoustic, speech, or tactile input.

The techniques described herein can be implemented using one or more modules. As used herein, the term "module" refers to computing software, firmware, hardware, and/or various combinations thereof. At a minimum, however, modules are not to be interpreted as software that is not implemented on hardware, firmware, or recorded on a non-transitory processor readable recordable storage medium (i.e., modules are not software per se). Indeed "module" is to be interpreted to always include at least some physical, non-transitory hardware such as a part of a processor or computer. Two different modules can share the same physical hardware (e.g., two different modules can use the same processor and network interface). The modules described herein can be combined, integrated, separated, and/or duplicated to support various applications. Also, a function described herein as being performed at a particular module can be performed at one or more other modules and/or by one or more other devices instead of or in addition to the function performed at the particular module. Further, the modules can be implemented across multiple devices and/or other components local or remote to one another. Additionally, the modules can be moved from one device and added to another device, and/or can be included in both devices.

The subject matter described herein can be implemented in a computing system that includes a back-end component (e.g., a data server), a middleware component (e.g., an application server), or a front-end component (e.g., a client computer having a graphical user interface or a web browser through which a user can interact with an implementation of the subject matter described herein), or any combination of such back-end, middleware, and front-end components. The components of the system can be interconnected by any form or medium of digital data communication, e.g., a communication network. Examples of communication networks include a local area network ("LAN") and a wide area network ("WAN"), e.g., the Internet.

Approximating language, as used herein throughout the specification and claims, can be applied to modify any quantitative representation that could permissibly vary without resulting in a change in the basic function to which it is related. Accordingly, a value modified by a term or terms, such as "about," "approximately," and "substantially," are not to be limited to the precise value specified. In at least some instances, the approximating language can correspond to the precision of an instrument for measuring the value. Here and throughout the specification and claims, range limitations can be combined and/or interchanged, such ranges are identified and include all the sub-ranges contained therein unless context or language indicates otherwise.

One skilled in the art will appreciate further features and advantages of the invention based on the above-described embodiments. Accordingly, the present application is not to be limited by what has been particularly shown and described, except as indicated by the appended claims. All publications and references cited herein are expressly incorporated by reference in their entirety.

The invention claimed is:

1. A method comprising:
   acquiring, by a camera of a first client device, first image data during an inspection of an object, the first image data characterizing a region of interest of the object, the region of interest containing one or more structures of the object;
   transmitting, by the first client device, the first image data to a prediction server communicably coupled to the first client device, the prediction server comprising a data processor and a computer vision algorithm executable by the data processor;
   determining, using the data processor and the computer vision algorithm, a plurality of pixels characterizing a position of at least one structure of the one or more structures within the region of interest, the computer vision algorithm including a plurality of image filters configured to filter the first image data with respect to photometric properties of a plurality of pixels of the first image data, each image filter of the plurality of image filters including one or more image filter parameters;
   transmitting, by the prediction server to a database communicatively coupled to the prediction server, first prediction data including an indication of the position of the at least one structure, wherein the prediction server is configured to train the computer vision algorithm using the first prediction data; and
   providing, via a display of the first client device, second image data including the indication of the position of the at least one structure.

2. The method of claim 1, wherein determining the plurality of pixels characterizing the position of the at least one structure within the region of interest further comprises
   receiving, using the data processor, training image data of the object, the training image data including at least one first annotation identifying at least one structure of an object present in at least one region of interest in the training image data;
   determining, using the data processor and a predictive model, at least one set of image filter parameter values associated with at least one image filter parameter of the plurality of image filters, the predictive model trained to receive the training image data including at least one first annotation and to determine the at least one set of image filter parameter values for each image filter parameter of the plurality of image filters based on applying at least one optimization technique using the training image data and the at least one first annotation; and
   updating at least one image filter of the computer vision algorithm based on the at least one set of image filter parameter values.

3. The method of claim 2, wherein the at least one optimization technique includes a grid search technique, a random search technique, a Levenberg-Marquardt technique, a gradient search technique, a Bayesian optimization technique, or a combination of two or more optimization techniques.

4. The method of claim 2, wherein the predictive model is trained to determine the at least one set of image filter parameter values for at least one of, a mean profile image filter parameter, a line tracking image filter parameter, or a stop criteria image filter parameter.

5. The method of claim 2, wherein responsive to providing the second image data, the method further comprises
   modifying, by the data processor, the indication in the second image data with at least one annotation and including the modified second image data with the at least on annotation in the training image data, the modified second image data including the annotation of the at least one structure;
   characterizing, by the data processor, the region of interest of the object, wherein the characterizing includes characterizing a defect in the region of interest or characterizing the region of interest as defective; and
   determining, by the data processor, the at least one set of image filter parameter values based on the training the predictive model using the training image data including the modified second image data and the annotation of the at least one structure.

6. The method of claim 1, wherein the computer vision algorithm is configured to generate profile data associated with a portion of the plurality of pixels, the portion corresponding to at least one structure present within the region of interest, and the profile data including at least one of photometric data, tip detection data, particle detection data, or void detection data.

7. The method of claim 1, wherein the first image data comprises two-dimensional computed tomography image data, three-dimensional computed tomography image data, or x-ray radiograph data.

8. The method of claim 1, wherein the object is a lithium-ion battery, a nickel-metal hydride battery, or a nickel-cadmium battery.

9. The method of claim 1, wherein the region of interest includes at least one of a cathode of a battery, an anode of a battery, a housing of a battery, a volume between a cathode of a battery and an anode of a battery, a centerline of a cathode of a battery, a centerline of an anode of a battery, and a profile of a shape of a battery.

10. The method of claim 1, further comprising
    determining, using the data processor, an alignment of one or more portions of the first image data, the one or more portions including the region of interest characterizing the object; and
    providing, by the data processor, an indication of the alignment of one or more portions of the first image data via the display of the first client device.

11. A system comprising:
    a prediction server communicably coupled to a first client device, the prediction server including a data processor, and a memory storing computer-readable instructions, at least one predictive model, and at least one computer vision algorithm, the data processor configured to execute the computer-readable instructions, which when executed, cause the data processor to perform operations comprising:

receiving first image data from the first client device, the first image data acquired by a camera of the first client device during an inspection of an object, the first image data characterizing a region of interest of the object, the region of interest containing one or more structures of the object;

determining, using the data processor and the computer vision algorithm, a plurality of pixels characterizing a position of at least one structure of the one or more structures within the region of interest, the computer vision algorithm including a plurality of image filters configured to filter the first image data with respect to photometric properties of a plurality of pixels of the first image data, each image filter of the plurality of image filters including one or more image filter parameters;

transmitting, by the prediction server to a database communicably coupled to the prediction server, first prediction data including an indication of the position of the at least one structure, wherein the prediction server is configured to train the computer vision algorithm using the first prediction data; and providing, via a display of the first client device, second image data including the indication of the position of the at least one structure.

12. The system of claim 11, wherein the instructions cause the data processor to determine the plurality of pixels characterizing the position of the at least one structure within the region of interest by performing operations further comprising receiving training image data of the object, the training image data including at least one first annotation identifying at least one structure of an object present in at least one region of interest in the training image data;

determining, using a predictive model stored in the memory, at least one set of image filter parameter values associated with at least one image filter parameter of the plurality of image filters, the predictive model trained to receive the training image data including at least one first annotation and to determine the at least one set of image filter parameter values for each image filter parameter of the plurality of image filters based on applying at least one optimization technique using the training image data and the at least one first annotation; and updating at least one image filter of the computer vision algorithm based on the at least one set of image filter parameter values.

13. The system of claim 12, wherein the at least one optimization technique includes a grid search technique, a random search technique, a Levenberg-Marquardt technique, a gradient search technique, a Bayesian optimization technique, or a combination of two or more optimization techniques.

14. The system of claim 12, wherein the predictive model is trained to determine the at least one set of image filter parameter values for at least one of a mean profile image filter parameter, a line tracking image filter parameter, or a stop criteria image filter parameter.

15. The system of claim 12, wherein responsive to providing the second image data, the instructions cause the data processor to perform further operations comprising modifying the indication in the second image data with at least one annotation and including the modified second image data with the at least one annotation in the training image data, the modified second image data including the annotation of the at least one structure and characterizing the region of interest of the object;

characterizing the region of interest of the object, wherein the characterizing includes characterizing a defect in the region of interest or characterizing the region of interest as defective; and determining the at least one set of image filter parameter values based on training the predictive model using the training image data including the modified second image data and the annotation of the at least one structure.

16. The system of claim 11, wherein the computer vision algorithm is configured to generate profile data associated with a portion of the plurality of pixels, the portion corresponding to at least one structure present within the region of interest, and the profile data including at least one of photometric data, tip detection data, particle detection data, or void detection data.

17. The system of claim 11, wherein the first image data comprises two-dimensional computed tomography image data, three-dimensional computed tomography image data, or X-ray radiographic data.

18. The system of claim 11, wherein the object is a lithium-ion battery, a nickel-metal hydride battery, or a nickel-cadmium battery.

19. The system of claim 11, wherein the region of interest includes at least one of a cathode of a battery, an anode of a battery, a housing of a battery, a volume between a cathode of a battery and an anode of a battery, a centerline of a cathode of a battery, a centerline of an anode of a battery, and a profile of a shape of a battery.

20. The system of claim 11, wherein the instructions cause the data processor to perform further operations comprising determining an alignment of one or more portions of the first image data, the one or more portions including the region of interest characterizing the object; and providing an indication of the alignment of one or more portions of the first image data via the display of the first client device.

* * * * *